Feb. 7, 1967 — W. E. ROOD, JR — 3,302,247

COTTON GINNING APPARATUS

Filed July 23, 1962 — 2 Sheets-Sheet 1

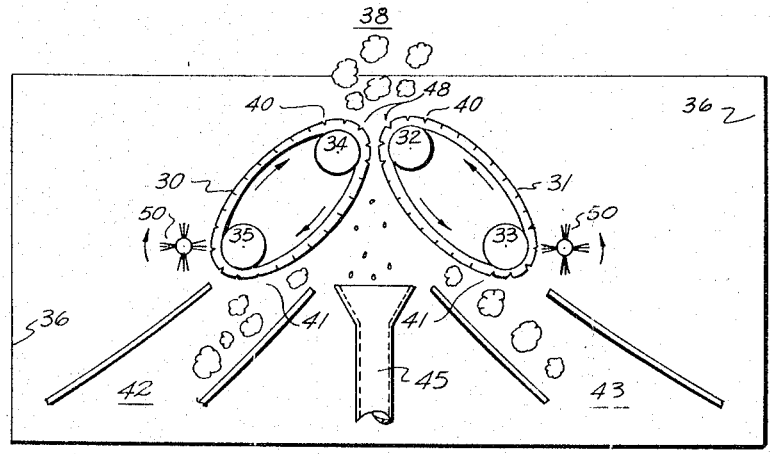

United States Patent Office 3,302,247
Patented Feb. 7, 1967

3,302,247
COTTON GINNING APPARATUS
William E. Rood, Jr., 1500 S. 7th St.,
Phoenix, Ariz. 85034
Filed July 23, 1962, Ser. No. 211,724
3 Claims. (Cl. 19—48)

This invention pertains to cotton ginning methods and apparatus, and more specifically, to an improved method and means for removing the cotton fiber from cotton seeds.

Present cotton ginning methods and apparatus usually include a series of gin saws the teeth of which extend through a cage-like container and snag the fibers of cotton tufts which are in the container. The openings in the container are large enough for the saw teeth to extend therethrough and snag the cotton; however, these openings are not large enough to admit cotton seeds. Therefore, the saws snag the fiber of the cotton tuft and pull it through the openings in the cage structure and leave the cotton seeds behind.

The cotton is subsequently removed from the saws by a series of brushes, and the seeds are continuously removed from the cage-like container and replaced with new cotton tufts. The action of the saw teeth on the cotton tufts causes tearing, and therefore shortening, of the cotton fibers. The quality of the cotton after ginning may be substantially increased by increasing the average length of cotton fiber.

Accordingly, it is an object of the present invention to provide apparatus for separating cotton fiber from cotton seed.

It is another object of the present invention to provide a means for ginning cotton that will yield improved quality ginned cotton.

It is still another object of the present invention to provide a method for removing cotton fiber from the cotton seed.

It is another object of the present invention to provide a method for ginning cotton whereby the cotton tufts are simultaneously grasped at different points on the tuft and subsequently pulled apart to separate the cotton fibers from the cotton seed.

Further objects and advantages of the present invention will become apparent to those skilled in the art as the description thereof proceeds.

Briefly stated, in accordance with one embodiment of the present invention, a cotton gin is provided which utilizes a pair of flexible belts each of which is provided with transverse cuts or slots. These slots are adapted to open when the belt is flexed (for example, when the belt passes over a pulley), and to remain closed when the belt is relatively unflexed (for example, the portion of the belt between pulleys). Therefore, when the belt passes over a pulley, the slots open and subsequently close as the belt leaves the pulley. The opening and closing of these slots may be used to grasp cotton tufts and transport the tufts for the length of the belt to be released when the belt once again flexes at the next pulley. The present invention utilizes pairs of flexible belts which are arranged to grasp cotton tufts at a cotton feed area and pull the tufts apart so as to remove the fiber from the cotton seed and transport the cotton to a fiber discharge area to be released. These pairs of belts may be cascaded by placing the cotton feed area of each pair adjacent the fiber discharge area of a preceding pair thus subjecting the cotton tufts to successive ginning operations to insure that the fiber has been removed from the cotton seed before the seed is discarded.

The invention both as to its organization and operation, together with further objects and advantages thereof may best be understood by reference to the following description taken in connection with the accompanying drawings in which:

FIG. 4 is a cotton ginning apparatus incorporating the teachings of the present invention.

FIG. 5 illustrates a cotton ginning system incorporating the teachings of the present invention.

Figure 1:
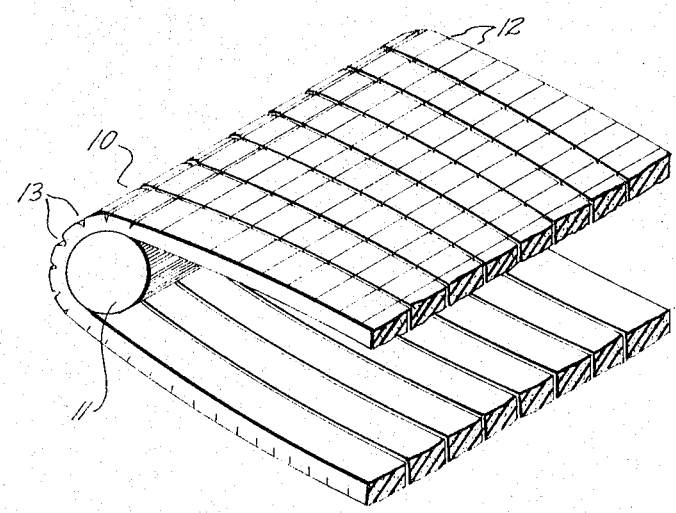
FIG. 1 is a partial perspective view of flexible belts suitable for use in the present invention.

Referring to FIG. 1, flexible belts 10 are shown as they pass over a drum or pulley 11. The belts are provided with a series of transverse cuts or slots 12 which, when the belts pass over the pulley 11, open to form V-shaped openings 13 in the periphery thereof. The flexible belts 10, formed as shown in FIG. 1, may therefore be utilized to grasp cotton in the V-shaped openings 13 as the belts pass over the pulley 11. When the V-shaped openings pass over the pulley, they close and therefore grasp the fibers of a cotton tuft as will be explained more fully hereinafter. A belt of the type shown is described and claimed in Patent Number 2,670,584.

Figure 2:
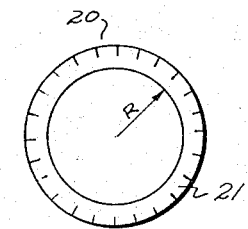
FIG. 2 is a schematic illustration of a flexible belt to illustrate a method for manufacture of a typical belt.

Referring to FIG. 2, a schematic illustration of a flexible belt is shown to illustrate one method for manufacturing suitable flexible belts. The belt 20 is molded or otherwise formed in a circular shape, and while held in the circular shape, a series of transverse cuts or slots 21 are formed or cut therein. Then when the belt is maintained either straight or curved with a radius of curvature equal to R or greater, the cuts will remain closed. When the belt is straightened, the cuts will remain closed and will also exert pressure on the slots thus gripping anything that may be in the slots.

Figure 3:
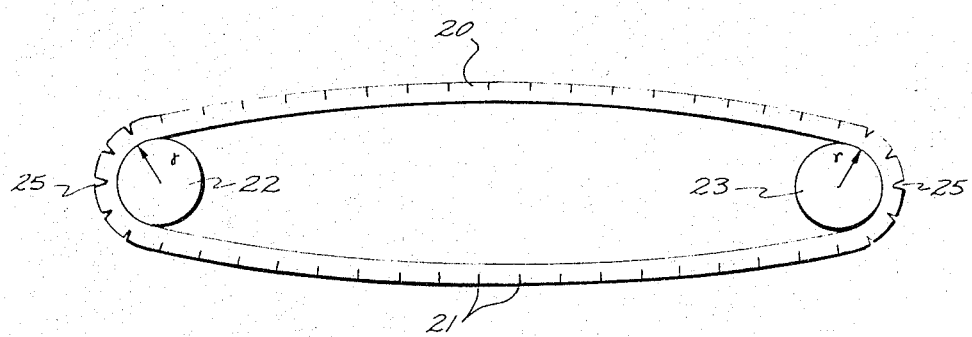
FIG. 3 is a diagram of a flexible belt riding a pair of pulleys to illustrate the operation of the flexible belts.

FIG. 3 illustrates the use of a flexible belt as shown in FIG. 2 on a pair of pulleys, and illustrates the employment of the flexible belt as a gripping means in the present invention. The belt 20 having the transverse slots 21 therein is placed over a pair of pulleys 22 and 23 each having a radius $r$ less than the radius R of the belt 20 when it was formed. As a consequence of the smaller radius of curvature on the drums or pulleys 22 and 23, the slots 21 open as the belt passes over the pulleys to form V-shaped openings 25 in the periphery of the belt. These openings 25 close as the respective slots travel past the pulley to the straight portion of the belt.

Referring to FIG. 4, a cotton ginning apparatus constructed in accordance with the teachings of the present invention is shown. A pair of flexible belts 30 and 31 are mounted over flexing means such as drums or pulleys 32, 33, 34 and 35 and are positioned so that one of the flexed portions of each of the belts 30 and 31 are in proximity with each other. The pulleys 32, 33, 34, and 35 are maintained in spaced apart relation with each other by securing the pulleys to a suitable frame, schematically shown in FIG. 4 at 36. The spaced apart relation need not be a rigid one; for example, the belts may be urged to contact each other at the flexed portion thereof by spring loading one or both of pulleys 32, 34. Those portions of the belts which are closest define a cotton feed area 38 wherein cotton tufts may be fed and subsequently grasped by the belts 30 and 31 to be transported to discharge areas. As belt 30 flexes over the drum 34, the belt 31 flexes over the drum 32, the slots in the belt open to form V-shaped openings 40 to therefore permit the fibers of a cotton boll to enter the V-shaped openings and be grasped by the openings as they close when the respective belts pass over the pulleys. Since the belts 30 and 31 are positioned so that the respective slots 40 close at approximately the same position relative to each other, the slots will close simultaneously on the cotton tuft or tufts positioned therebetween. As a consequence, the cotton tuft will be gripped on either side by the two belts 30 and 31 and, as the tuft attempts to travel the length of the belts the fibers are pulled from the seed and transported to a discharge area.

The pulleys 33 and 35 may be positioned further apart than the pulleys 32 and 34 to permit the belts 30 and 31 to pull the fibers from the cotton seed. Each of the belts 30 and 31 has a fiber discharge portion 41 and a fiber discharge area 42 and 43, respectively, wherein the belt is flexed again and the slots are opened to release the cotton fibers. Any suitable means may be utilized to aid in the cotton fiber removal, such as, for example, rotating brushes 50 and any convenient receptacle or conveying means may be used to gather the cotton fiber as it drops from the belts 30 and 31. A hopper such as shown at 45 may be utilized to catch the cotton seeds as they fall from the belts 30 and 31. The slots in the respective belts open in the cotton feed area 38 to grasp the fibers of the cotton tuft; however, the slots 40 do not open wide enough to grip the cotton seed. Therefore, the cotton seeds are not transported by the flexible belts 30 and 31 unless the seeds are adhering to fibers which have been grasped by the belts. The gripping portions 48 of the respective belts are positioned so that each belt may simultaneously grasp a cotton tuft and pull the fibers from the seed; however, these gripping portions may be placed a small distance apart sufficient to permit a cotton seed to fall between the belts.

The operation of the apparatus shown in FIG. 4 is as follows. Cotton tufts are placed in the cotton feed area 38, and the belts 30 and 31 are driven over the pulleys in the direction shown by the arrows. As the belts pass over the respective pulleys 32 and 34, the transverse slots therein open to form V-shaped openings in the periphery of the belt such as shown at 40. As these openings pass through the cotton feed area, the openings close thereby simultaneously grasping opposite sides of cotton tufts. As the tuft attempts to travel the length of each belt 30 and 31, it is pulled apart since the belts become further apart as they travel toward the respective pulleys 33 and 35. The fibers are thus pulled from the cotton seed which may be dropped into a hopper 45 or any suitable receptacle for catching cotton seeds, and the fibers are transported the length of the respective belt to the discharge area 42 or 43 where the belt is once again flexed and the slots opened to release the cotton fibers.

It will be apparent that the cotton seed may adhere to the cotton fiber after the tuft from which it came has been pulled apart by the two belts. That is, the fibers may not all be pulled from the seed and the seed may travel the length of the belt to the respective discharge area with that portion of the fiber still adhering to the seed.

Accordingly, it may be necessary to employ a series of these ginning apparatus such as shown in FIG. 4 wherein the cotton is subjected to a series of ginning processes to clean all of the cotton from the seed. FIG. 5 illustrates a cotton ginning system utilizing the cotton gin apparatus of FIG. 4. Referring to FIG. 5, cotton is fed into the cotton feed area 38 in a manner similar to that described in connection with FIG. 4. As the cotton is ginned by the flexible belts 30 and 31, the discharged fibers are discharged into cotton feed areas of subsequent cotton ginning apparatus. Thus, the discharge areas 42 and 43 of the ginning apparatus utilizing belts 30 and 31, correspond to the cotton feed areas of two succeeding cotton gin apparatus. In this manner, the cotton is subjected to the series of ginning processes whereby the seed is separated from the fiber.

The method and apparatus for ginning cotton described by the teachings of the present invention may be utilized as an input for prior art cotton gins. For example, it may be desirable to partially separate cotton fiber from the cotton seeds in accordance with the present invention and then complete the separation by using conventional gin saw methods. The result of such preliminary ginning is greater average fiber length and thus improved fiber quality. Another example of the combined use of the present invention with prior art ginning methods is the separation of relatively large tufts of cotton on cotton locks into smaller tufts of cotton prior to the final ginning operation. Cotton locks containing several seeds may be separated by use of the present invention into smaller tufts of cotton having fewer seeds prior to the introduction of the cotton into conventional ginning apparatus.

It will be obvious to those skilled in the art that many variations of the teachings disclosed and described herein may be made without departing from the spirit and scope of the invention, and therefore this invention is to be considered as limited only in accordance with the features thereof as set forth in the claims appended hereto.

What is claimed as new and desired to secure by Letters Patent of the United States is:

1. A cotton ginning apparatus comprising, a first and a second gripping means each comprising a flexible belt having transverse slots therein for opening when the corresponding portion of said belt flexes and for remaining closed at all other times, a first pair of flexing means each mounting one of said belts for flexing the corresponding belt to enable the belt to grasp seed cotton tufts, a second pair of flexing means each mounting one of said belts for flexing the corresponding belt to enable the belt to release cotton tufts pulled from the seed, a frame for maintaining said flexing means in spaced apart relation and said first pair of flexing means nearer each other than said second pair of flexing means, said first pair of flexing means positioned on said frame to enable said first and second belts to simultaneously flex and simultaneously grasp the same seed cotton tufts.

2. A cotton ginning apparatus comprising, a first and a second gripping means each comprising a flexible belt having transverse slots therein for opening when the corresponding portion of said belt flexes and for remaining closed at all other times, a first pair of pulleys each mounting one of said belts for flexing the corresponding belt to enable the belt to grasp seed cotton tufts, a second pair of pulleys each mounting one of said belts for flexing the corresponding belt to enable the belt to release cotton tufts pulled from the seed, a frame for maintaining said pulleys in spaced apart relation and said first pair of pulleys nearer each other than said second pair of pulleys, said first pair of pulleys positioned on said frame to enable said first and second belts to simultaneously flex and simultaneously grasp the same seed cotton tufts.

3. A cotton ginning apparatus comprising, means defining a seed cotton feed area, a first and a second gripping means each comprising a flexible belt having transverse slots therein for opening when the corresponding portion of said belt flexes and for remaining closed at all other times, a first pair of pulleys each mounting one of said belts for flexing the corresponding belt to enable the belt to grasp seed cotton tufts, a second pair of pulleys each mounting one of said belts and each positioned beneath a corresponding one of said first pair of pulleys, each of said second pair of pulleys also displaced from a vertical line drawn through the axis of the corresponding one of said first pair of pulleys in a direction away from the other of said second pair of pulleys, a frame for maintaining said pulleys in spaced apart relation and said first pair of pulleys nearer each other than said second pair of pulleys, said first pair of pulleys positioned on said frame to enable said first and second belts to simultaneously flex and grasp the same seed cotton tufts.

References Cited by the Examiner

UNITED STATES PATENTS

| | | | |
|---|---|---|---|
| 718,635 | 1/1903 | King | 19—48 |
| 750,567 | 1/1904 | Barber | 19—48 |
| 841,385 | 1/1907 | Fordyce | 19—53 |
| 1,265,470 | 5/1918 | Marsden | 19—48 |
| 2,228,619 | 1/1941 | Watson | 19—48 |

MERVIN STEIN, *Primary Examiner.*

D. NEWTON, *Examiner.*